Sept. 2, 1930.   J. P. TEMPLEMAN   1,774,735
HAND BRAKE FOR RAILWAY CARS
Filed Nov. 26, 1926
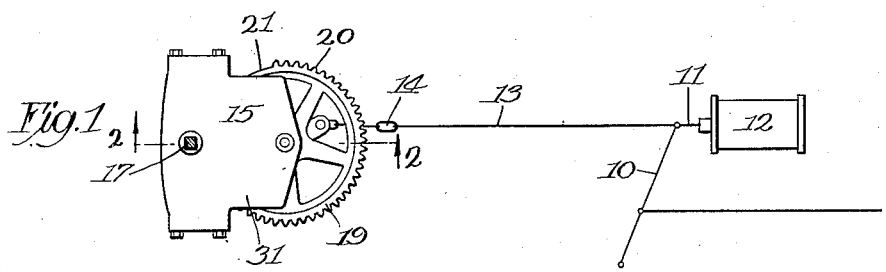
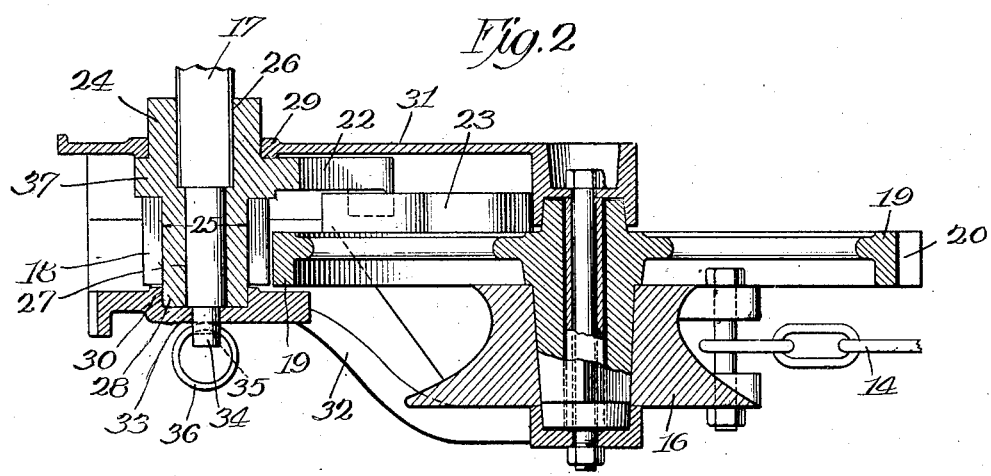
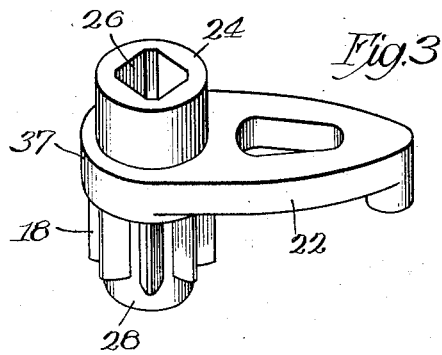
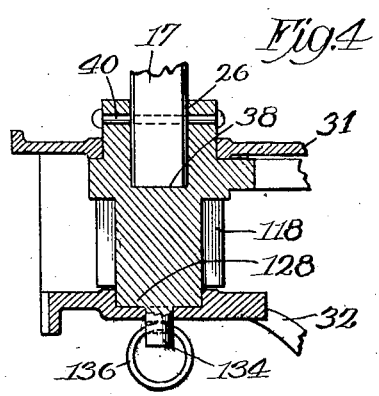
Inventor:
John P. Templeman
By Gillson, Mann & Cox,
Attys.

Patented Sept. 2, 1930

1,774,735

UNITED STATES PATENT OFFICE

JOHN P. TEMPLEMAN, OF CHICAGO, ILLINOIS

HAND BRAKE FOR RAILWAY CARS

Application filed November 26, 1926. Serial No. 150,666.

In a great many cars the space available for gearing in the hand brake is very limited, and difficulty has been experienced in getting a proper connection between the brake shaft and the gearing without disturbing the desired correlation of the parts. The principal object of this invention is to overcome this difficulty. Other and more specific objects will appear and can best be made clear in connection with the description and the drawings attached hereto in which Fig. 1 is a diagrammatic plan view illustrating the preferred form of the invention applied in connection with a conventional form of foundation brake gear;

Fig. 2 is a vertical section taken on the line 2—2 of Fig. 1;

Fig. 3 is a perspective view of the pinion element, and

Fig. 4 is a fragment corresponding to the left portion of Fig. 2, showing a modification.

In the diagrammatic view shown in Fig. 1, 10 indicates a cylinder lever of the conventional foundation brake gear by which the push rod 11 of a conventional air brake cylinder 12 operates the brakes. The hand brake rod 13 is secured to the push rod 11 in the usual way and equipped at its otherwise free end with a length of chain 14 adapted to cooperate with the winding mechanism of the hand brake, generally indicated in Fig. 1 by the numeral 15.

This mechanism includes (Fig. 2) a drum 16 and a shaft 17 mounted to rotate about a parallel axis, together with a quick take-up drive by which the shaft gives the drum rapid rotation, and a power drive by which it continues the rotation of the drum at less speed but with the required power for proper application of the brakes.

The power drive includes a pinion 18 rotating with the shaft 17 and an interrupted gear 19 rotating with the drum and having a toothed segment 20 (Fig. 1) and a blank segment 21.

The quick take-up drive includes an arm 22 rotating with the shaft 17, and the cam 23 rotating with the gear 19. The details of this mechanism are described and claimed in my Patent No. 1,594,912, issued August 3, 1926, but the present invention is not limited to those details and, hence, a description of them will be omitted in the interest of brevity.

In all the forms of geared hand brake mechanism there must be considerable multiplication in order that the average brakeman turning the standard hand wheel, or hand lever mechanism, may apply the brakes with the required pressure. The gear must be many times larger than the pinion and, hence, the space required for the mechanism rapidly increases with small increases in the size of the pinion.

The importance of this arises in connection with the standard requirement that brake shafts of one and one-half inch (1½″) square stock be used and that such shafts project through the gearing or other winding mechanism and be fixed against withdrawal.

If such a shaft is extended through the pinion it establishes a minimum size for that pinion which requires a minimum size for the gear of such large dimensions that it is difficult to find space on the car for the mechanism.

The difficulty is overcome in the preferred form, here illustrated, as follows.

The pinion 18 is provided with a laterally extending hub portion 24 somewhat larger than the diameter of the pinion at the base of the teeth and represented in the drawings by the lines 25. This extension is equipped with a polygonal socket, or bore 26, complemental to the shaft 17, and communicates with a smaller circular bore 27 extending through the pinion proper or the area surrounded by the bases of the teeth. By this means the hub can be made of any dimensions necessary to give the required strength without effecting the diameter of the pinion and, therefore, without affecting the over-all size of the gearing or the correlation between its parts.

In this peferred structure the pinion is also provided with a laterally extending hub portion 28 and the hub portions 24 and 28 function as trunnions journaled in the bearings 29 and 30 of the frame members 31 and 32. The bearing 30 is in the form of a pocket in a boss on the frame member 32 and the bottom of the pocket is perforated at 33 to receive a small extension 34 on the brake shaft perforated at 35 to receive a ring 36 by which the shaft is secured against upward withdrawal.

At the juncture of the hub extension 24 with the pinion an annular flange 37 is provided and upon which the arm 22 is formed. This flange is joined to the upper ends of the teeth of the pinion 18 and serves to strongly reenforce the pinion unit against strains communicated between the shaft 17 and the teeth of the pinion.

Where desired and found permissible the small circular bore 27 may be dispensed with and the squared shaft made to terminate at the base 38 of the polygonal bore 26, as indicated in Fig. 4. The pinion proper 118 in such a structure is solid as is also the hub extension 128, which is provided with a projection 134 perforated to receive a ring 136. The shaft 17 may be secured to the pinion unit by a transverse pin 40.

From the foregoing it will be clear that the invention provides a very simple and compact arrangement by which the difficulties heretofore encountered are overcome and the principles of which can be embodied in various hand brakes by those skilled in the art.

While I have made use of a specific and preferred form to illustrate the invention, I do not intend that the claims shall be limited thereby.

I claim as my invention:

1. In a hand brake mechanism for railway cars, spaced frame members, a pinion, a lateral hub extension on one side of the pinion larger than the pinion at the base of the teeth and provided with a polygonal bore, a flange surrounding the extension and joining the ends of the teeth and a polygonal shaft received within the polygonal bore.

2. In a hand brake mechanism for railway cars, spaced frame members, a pinion, a lateral hub extension on one side of the pinion larger than the pinion at the base of the teeth and provided with a polygonal bore, a flange surrounding the extension and joining the ends of the teeth and a polygonal shaft received within the polygonal bore, said flange having an arm projecting therefrom.

3. In a hand brake mechanism for railway cars, spaced frame members, a pinion, a lateral hub extension on one side of the pinion substantially larger than the pinion at the base of the teeth and joining the ends of the teeth, said extension being provided with a polygonal bore of greater size than could safely be made through the pinion, and a polygonal shaft received within the polygonal bore.

In testimony whereof I affix my signature.

JOHN P. TEMPLEMAN.